J. J. SHERMAN.

Improvement in Elastic Wheels for Railway-Cars.

No. 126,096. Patented April 23, 1872.

Witnesses: Inventor:
Edw. W. Donn J. J. Sherman
J. M. Gardner By his attys.

126,096

UNITED STATES PATENT OFFICE.

JOSIAH J. SHERMAN, OF ALBANY, NEW YORK.

IMPROVEMENT IN ELASTIC WHEELS FOR RAILWAY CARS.

Specification forming part of Letters Patent No. 126,096, dated April 23, 1872.

Specification describing certain Improvements in Car-Wheels, by J. J. SHERMAN, of Albany, New York.

My invention relates to car-wheels made in two or more sections, with a body of elastic material between the inner section or hub and outer section or rim; and my improvements, which are too fully described hereafter to need preliminary explanation, are designed to compress the packing and maintain it in a compressed state, and to securely retain the tire without there being any direct contact between the same and the hub.

Figures 1, 2:
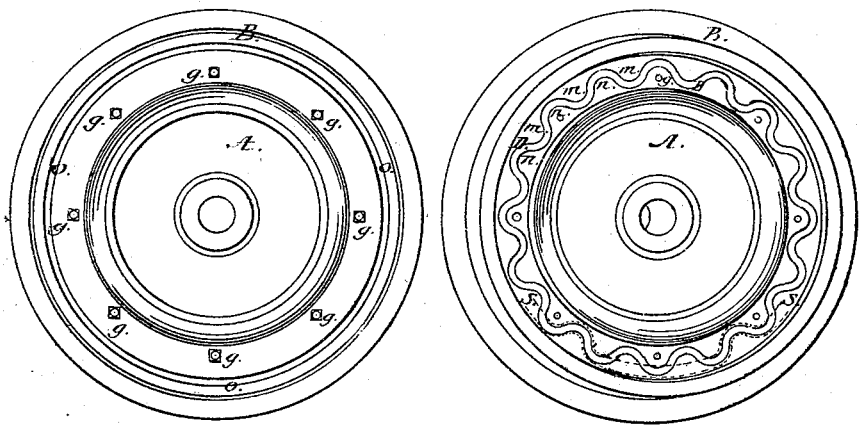
Figure 3:
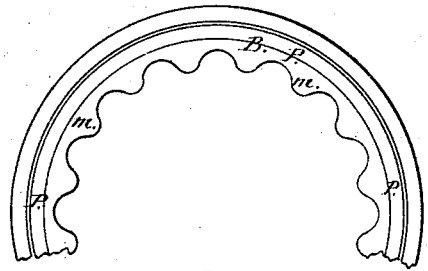
Figure 4:
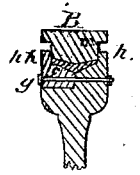

In the accompanying drawing, Figure 1 is a side view of my improved car-wheel; Fig. 2, a perspective view, part of the wheel being removed; Fig. 3, a detached view of part of the wheel; Fig. 4, a transverse section of part of the wheel; and Fig. 5, a sectional view, showing a modification.

General Description.

The wheel consists of two main portions, the center or hub A, and the rim or tire B; and the hub, in the present instance, is in two sections—a horizontal annular shoulder being formed on the larger section for the reception of the smaller section C, which is annular in form, and is secured and adjusted laterally by bolts $g$. The periphery of the hub is cut away to form an annular V-shaped recess and two annular flanges, $h$ $h$—one flange and one of the inclined faces of the recess being on the adjustable section C, and the other flange and face being on the stationary part of the hub. The inner end of the rim B (or of an annular projection on the rim) is beveled from the center in both directions, as shown in Fig. 4, and is also corrugated, as shown in Fig. 3, the inclined faces of the recess in the hub being in like manner corrugated. The corrugated faces of the hub and rim are not in contact; but the teeth or projections $m$ $m$ on the rim project a short distance into the recesses between the teeth on the hub, forming an annular waved recess, within which is compressed a corrugated packing of vulcanized rubber or other elastic or semi-elastic material.

This packing, by moving the section C laterally inward, is compressed to such a density as to effectually prevent any extended movement of the hub within the rim. Care should be taken to have the ends of the packing securely and evenly united, unless it is made without a joint, which is preferable.

If the bearing-surfaces are sufficiently inclined the flanges $h$ $h$ may be dispensed with, which is preferable, as the compressed elastic packing will then be the sole medium for resisting the lateral movements of the rim, which, being thus isolated from the hub, cannot impart to the latter the jars and vibrations to which it is subject.

It is not necesssary for the adjacent faces of the hub and rim to be corrugated throughout their whole extent; in most instances the corrugations may be intermitted, except at one or two points, as shown in dotted lines $s$ $s$, Fig. 2.

Figure 5:
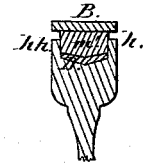

Instead of compressing the packing by means of an adjustable section, C, a solid hub, with a V-shaped recess in its periphery, may be used, and the annular rim $m'$, Fig. 5, on the rim, may be made detachable and in sections, upon which, after they are adjusted, the tire is shrunk.

It will be apparent that as the tire contracts the sections $m'$ will be brought together and the packing will be condensed. In this, as in the former case, the flanges $h$ $h$ may be dispensed with.

The adjacent ends of the sections should be tongued and grooved, and it is better to round the outer edges of the sections, and to recess the inner face of the tire, to insure the retention of the latter in its place.

Claims.

1. An elastic wheel having a hub or center consisting of two sections, with edges inclined in contrary directions, and with or without flanges $h$ $h$, a rim with two inclined inner faces, and an intervening packing, which is compressed by bringing together the two sections of the hub.

2. An elastic wheel in which the hub is recessed at the periphery to receive an annular packing, upon which a sectional ring is compressed by a surrounding tire shrunk on the same, as described.

In testimony whereof I have signed my name to this specification in the presence of two subscribing witnesses.

JOSIAH J. SHERMAN.

Witnesses:
R. L. VANDENBERGH,
PAUL F. COOPER.